United States Patent
Alula

Patent Number: 5,613,724
Date of Patent: Mar. 25, 1997

[54] GLARE REDUCING VISOR FOR VEHICLES

[76] Inventor: Makita G. Alula, 11/176, Cite Noulinard, Osny, France, 95-520

[21] Appl. No.: 362,489
[22] PCT Filed: May 13, 1994
[86] PCT No.: PCT/FR94/00572
    § 371 Date: Jan. 9, 1995
    § 102(e) Date: Jan. 9, 1995
[87] PCT Pub. No.: WO94/26543
    PCT Pub. Date: Nov. 24, 1994

[30] Foreign Application Priority Data

May 13, 1993 [FR] France .................. 93 05789

[51] Int. Cl.⁶ .................................................. B60J 3/02
[52] U.S. Cl. ........................................ 296/97.6; 296/97.8
[58] Field of Search .............................. 296/97.6, 97.9, 296/97.13, 97.8, 97.12

[56] References Cited

U.S. PATENT DOCUMENTS

| | | | |
|---|---|---|---|
| 2,261,881 | 11/1941 | Horstmann | 296/97.6 |
| 2,517,872 | 8/1950 | Hamel | 296/97.6 |
| 2,673,118 | 3/1954 | Phelps . | |
| 2,823,950 | 2/1958 | Harris | 296/97.6 |
| 3,201,170 | 8/1965 | Weingarten | 296/97.6 |
| 3,246,925 | 4/1966 | Calabrese | 296/97.6 |
| 3,333,887 | 8/1967 | Dryden | 296/97.6 |
| 3,679,255 | 7/1972 | Nacarato | 296/97.6 |
| 4,195,876 | 4/1980 | Timperio | 296/97.6 |
| 4,765,675 | 8/1988 | Svensson | 296/97.12 |
| 5,040,840 | 8/1991 | Kokeisl | 296/97.6 |

FOREIGN PATENT DOCUMENTS

| | | | |
|---|---|---|---|
| 1132147 | 3/1957 | France | 296/97.6 |
| 8901348 | 3/1989 | Germany . | |
| 527066 | 10/1957 | Italy | 296/97.9 |
| 8602322 | 4/1986 | Norway . | |

*Primary Examiner*—Gary C. Hoge
*Attorney, Agent, or Firm*—Loeb & Loeb LLP

[57] ABSTRACT

A transparent visor (2), particularly for a vehicle having a windscreen, associated with an opaque visor (1) and being swivel mounted at its top on the bottom portion of the opaque visor (1) by a connecting system (40, 30). The connecting system (40, 30) has first and second parts placed substantially at opposite ends of the top of the transparent visor (2) and the bottom of the opaque visor (1), respectively. The two parts (40, 30) provide rotation of the transparent visor (2) with respect to the opaque visor (1) in a first axis parallel to the top of the transparent visor (2), while the first part (40) enables the transparent visor (2) to be separated from the opaque visor (1) in such a way that the second part (30) provides for pivoting about a point at the top of the transparent visor (2).

11 Claims, 5 Drawing Sheets

GLARE REDUCING VISOR FOR VEHICLES

BACKGROUND OF THE INVENTION

The present invention relates to a device for dealing with problems caused by glare from the sun, headlights, etc., for all types of vehicles. It particularly concerns a system to permanently increase anti-glare protection for motorists.

Conventionally, protection against glare from the sun is afforded by an opaque sun visor. Because of limitations inherent in known visors, the driver often finds it necessary to resort to a pair of sun glasses, which may not always be available in the vehicle. Even if the driver does have sun glasses, the time required to locate them, clean them and put them on detracts from the driver's reaction time, frequently resulting in accidents and frontal collisions.

Moreover, the conventional visor only allows protection for the driver's left-hand side (for an automobile with left-hand drive), by allowing pivoting or rotation of the visor, from the right to the left, and this system is therefore completely ineffective for the center of the windshield.

It is already known to provide a transparent visor, whether it be complementary to the normal opaque visor or not, in order to increase protection against glare. For example, U.S. Pat. No. 2,673,118 discloses a device which covers the central and edge portions of a windshield, and includes auxiliary panels mounted to pivot exactly like a conventional visor, but intended to replace this kind of visor, rather than being adapted to it. This device covers the entire width of the vehicle windshield and the auxiliary panels can be pivoted in an upward or sideward fashion (toward the door) or can be left flush in the plane of the main opaque visor.

DE-U8901348 describes a visor whose upper section is attached by a movable hinge to the upper section of the opaque visor in such a way that it may be used in place of the visor and not as a complement to it. A socket is provided so that this visor can take an outside lateral position (door side) and not a central position (central rear-view mirror area).

Generally speaking, the proposed systems offer a solution based on a rotation of the transparent visor around either a vertical or a horizontal axis relative to the roof of the vehicle, utilizing different connecting systems.

The fastening of the transparent visor at its upper left section requires, on the one hand, attachment of the visor onto the opaque visor with movements that are at once coordinated with and independent of the complementary visor and the opaque visor, and requires, on the other hand, a splitting of the opaque visor, i.e. assembly of a visor that would, at times, overlap the entire surface of the opaque visor, leading to multiple manipulations.

SUMMARY OF THE INVENTION

It is an object of the present invention to remedy the above-described inconveniences.

The present invention concerns a transparent visor, particularly for a vehicle having a windshield, this visor being complementary to an opaque sun visor and having an upper section connected to the lower section of the opaque sun visor by a connecting system which includes a movable hinge.

According to the invention, the connection system is composed of first and second parts placed substantially at opposite ends of the upper portion of the transparent visor and the lower portion of the opaque visor, respectively, these first and second parts allowing a rotation of the transparent visor with respect to the opaque visor about a first axis parallel to the upper portion of the opaque visor while the first part allows the visors to be separated from one another in such a manner that the transparent visor can be pivoted around a point on the upper portion of the transparent visor.

According to a preferred embodiment of the invention, the first part of the connecting system consists of a hook that is vertically attached to the opaque visor in order to hold the transparent visor, and the second part of the connecting system consists essentially of a horizontal rod and a second rod, the horizontal rod forming a horizontal axis of rotation that projects into a horizontal aperture formed in the transparent visor and having a shoulder support at one end, the horizontal rod being provided with an opening designed to receive the second rod, and the second rod forming a vertical axis of rotation perpendicular to the horizontal axis of rotation and the second rod being fastened to the opaque visor.

According to a second feature of the invention, the opening provided in the horizontal rod is designed to cooperate with an end of the second rod which is in the form of a socket, with the other end of the second rod being fastened to the opaque visor.

Thus, the central portion of a windshield, where the rearview mirror is normally located, can also be protected, and the visor can be easily manipulated, while its cost of manufacture is reduced.

The transparent visor could advantageously be tinted, introducing an anti-reflection quality and/or some other qualities which would enable it to progressively absorb light according to the intensity of the incident rays.

It is therefore the originality of the system for connecting the opaque visor to the transparent visor that distinguishes the present invention.

The description herein refers to a vehicle having left-hand drive. The invention is not, however, limited to this one type of vehicle, the application of the invention to a vehicle with right-hand drive being obtained by simple axial symmetry.

Thus, it is possible to provide protection from direct frontal light by lowering the transparent visor in front of the windshield. Likewise, the upper left corner of the transparent visor can be unhooked from the opaque visor and then swivelled to the right to come in front of the central portion of the windshield, where the rearview mirror is located.

The invention will be better understood, and other objectives, advantages and characteristics will appear more clearly from a reading of the following description of preferred embodiments of the invention given by way of non-limiting example and with reference to the accompanying drawings

Figures 1A, 1B:
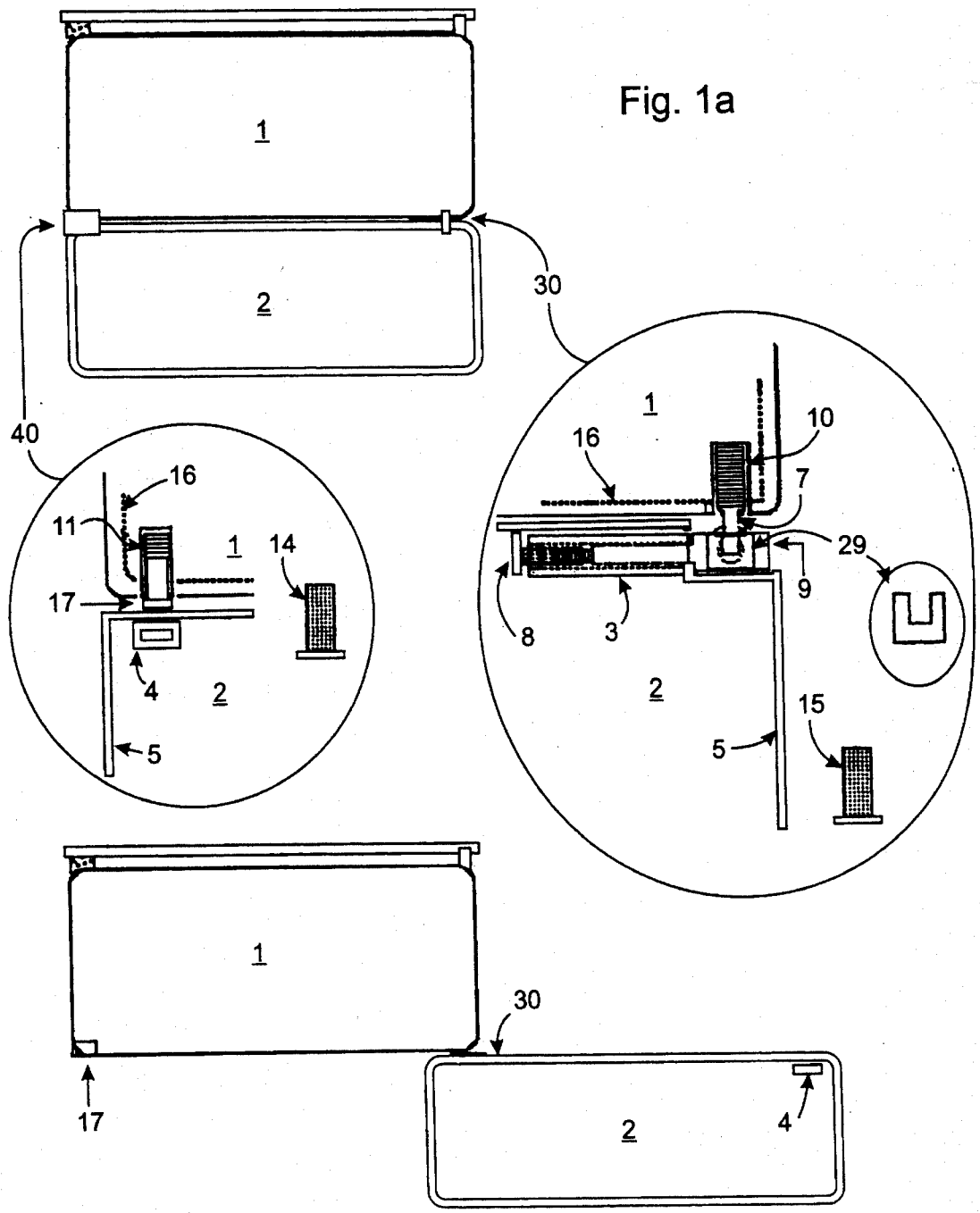
FIG. 1A schematically represents, with enlarged sections, an embodiment of the invention.
FIG. 1B illustrates the embodiment of FIG. 1A with the transparent visor open according to the invention.

With respect to the direction of the view of FIGS. 1A and 1B, opaque visor 1 is pivotally connected to the vehicle roof at the upper left-hand corner of visor 1. At the upper right-hand corner of visor 1, the visor is detachably secured to the vehicle roof. Such connections between visor 1 and the vehicle roof are conventional for the driver's side sun visor, which is the visor shown in FIGS. 1A and 1B.

DESCRIPTION OF THE PREFERRED EMBODIMENTS

Referring now to the accompanying Figures, the device illustrated therein includes an opaque sun visor 1 and a transparent visor 2. Transparent visor 2 is connected to the lower portion of opaque visor 1 at two attachment points by a connecting system 30, 40. Visor 2 can be attached at its upper left by part 40 of the connecting system and at its upper right by part 30 of the connecting system, which part 30 is made up of components 7, 8 and 9.

Connecting system part 30 forms a hinge that includes horizontal rod 9 in the form of a screw provided at one end with a shoulder support that cooperates with a second rod 7 to form a hinge. Rod 7 is screwed into a nut provided in the lower portion of opaque visor 1.

Figure 2:
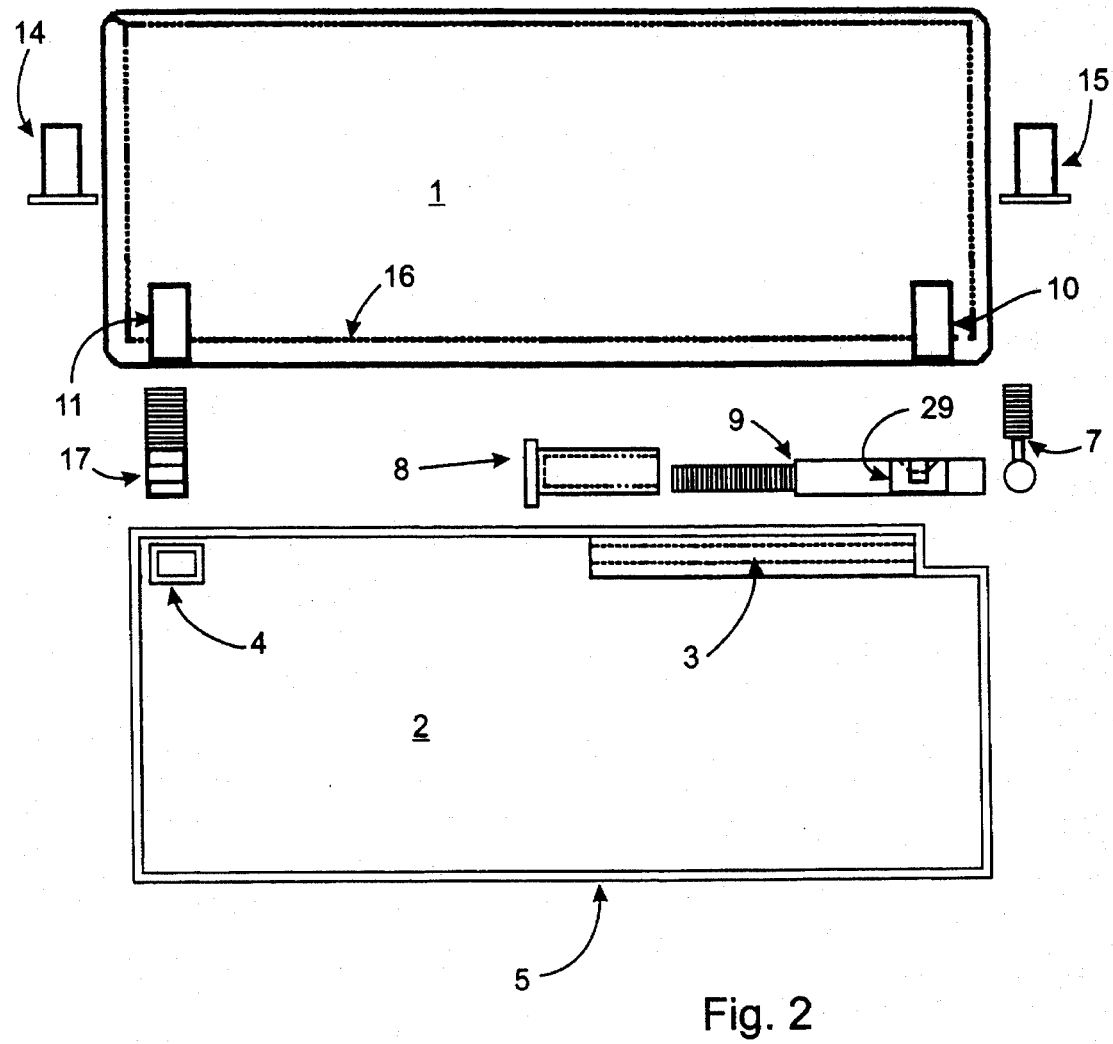
FIG. 2 is an exploded view of one form of construction of the embodiment of FIGS. 1.

In the embodiment shown in FIGS. 1A and 2, this hinge is formed by providing rod 7 with a socket which cooperates with an opening in rod 9 and the threaded end of rod 9 is received in a horizontal aperture 3 of visor 2. Rod 9 is held in aperture 3 by tightening a threaded part 8 onto the threaded part of rod 9.

According to the embodiment shown in FIGS. 3, the hinge is provided by providing rod 9 with a vertical opening through which the second rod 7 passes. Second rod 7 thus defines a rotational axis perpendicular to horizontal rod 9.

Referring to FIGS. 1 and 2, part 40 of the connecting system includes a hook 17 which is fastened to opaque visor 1. For example, hook 17 can be secured in a hole in the form of a nut cut into the lower left portion 11 of framework 16 of visor 1. Visor 2 is fastened to hook 17, for example by insertion of hook 17 into a cut-out opening in the upper left portion of visor 2.

According to the present invention, the transparent visor 2 can be installed in the vehicle at the time of manufacture or can be installed as an accessory in the vehicle at a later date.

When a visor according to the invention is installed as part of the manufacturing process, parts 30 and 40 of the connecting system will be installed ahead of time in opaque visor 1. Holes 10 and 11 for connection of these two parts could initially be closed by stoppers 14 and 15 (FIGS. 1A and 2) if transparent visor 2 is not to be installed. Furthermore, this manner of attachment provides the option of adding transparent visor 2 or not according to the demands of the customer, and giving the transparent visor a particular tint, quality, etc.

Figure 3A:
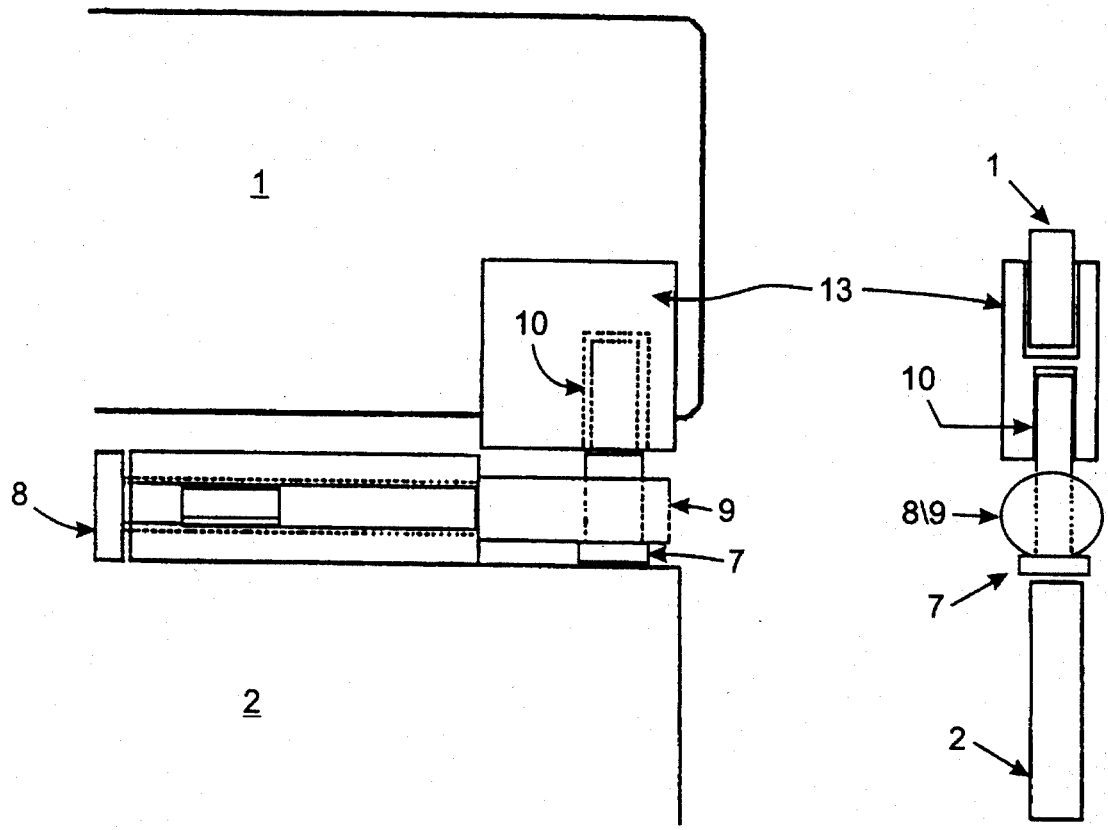
FIGS. 3A, 3B and 3C are detailed views illustrating arrangements for connecting the transparent visor to the opaque visor.
Figure 3B:
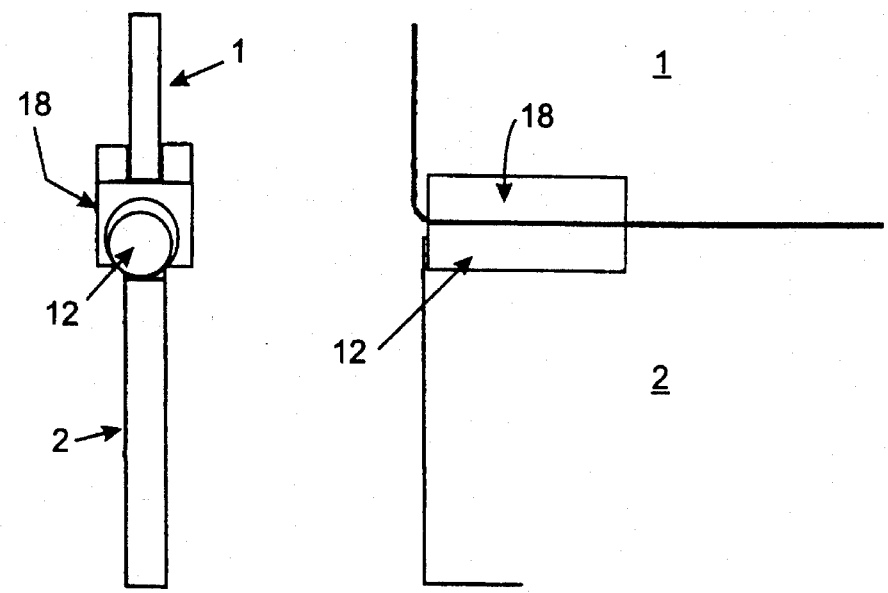
Figure 3C:
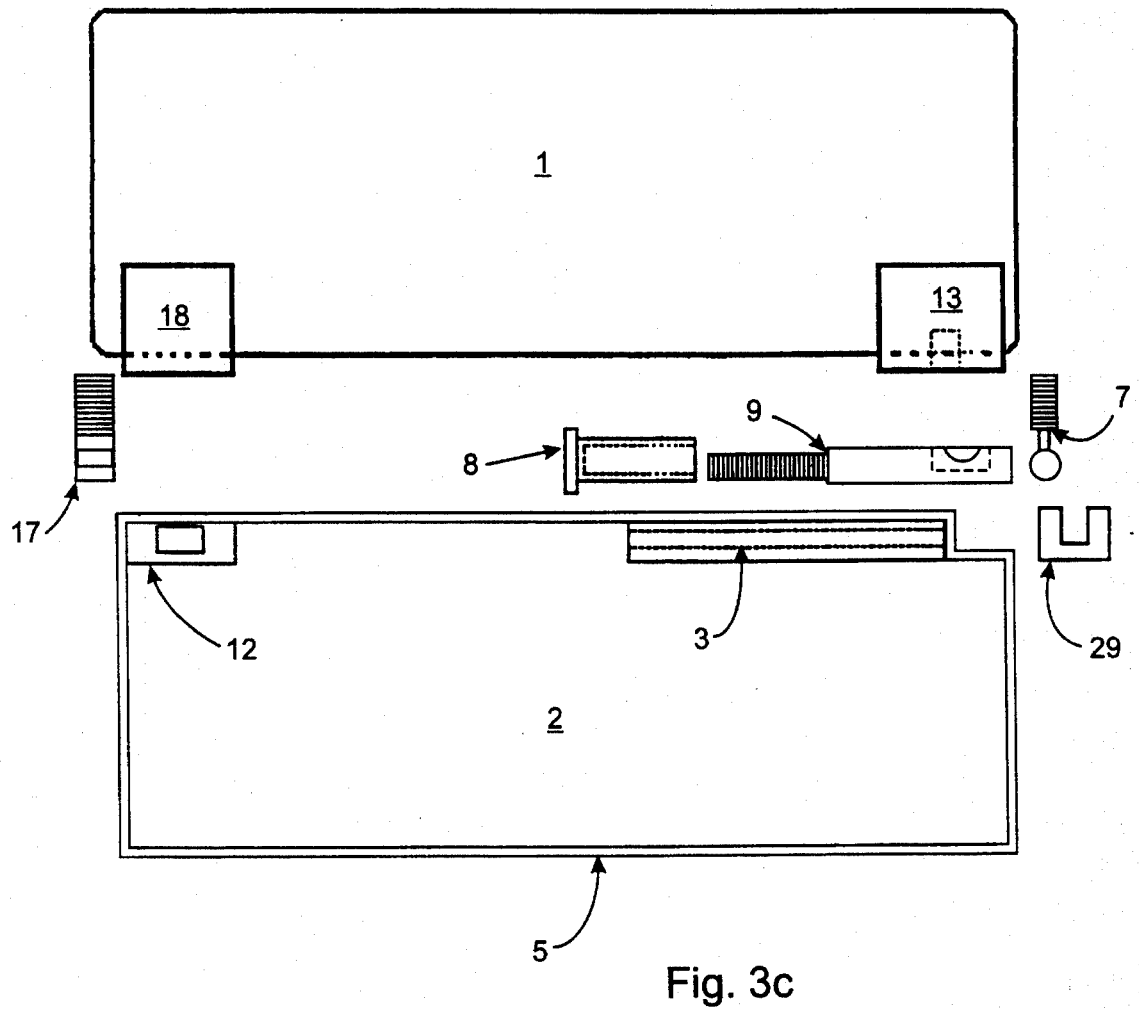

If transparent visor 2 is to be subsequently added as an accessory to the vehicle, the resulting assembly would still have the form according to the present invention, as described above. FIG. 3B shows a side view of an attachment system using a socket in a part 18 which connects the lower right portion of visor 1 to the upper right portion of visor 2 with a clip. Hooking visor 2 at its upper left side can be achieved by simply pressing a rounded part 12 designed for the upper left portion of visor 2 onto the part forming clip 18 that was previously fastened to opaque visor 1 and includes at its base a hollowed-out area. Likewise, the right-hand hinge is fastened to a corresponding part 13, as shown in FIG. 3A, of the same nature as clip 18, part 13 having been previously fastened to opaque visor 1, as shown in FIG. 3C, by clipping to a base part in which a threaded opening has been formed.

Referring to FIG. 1B, with a structure according to the invention, visor 2 can be placed with respect to the central rearview mirror of the vehicle, with visor 2 in its entirely open position, and can thus protect the driver from glare coming from the front or the side, a region which is usually left unprotected.

Main visor 1 can be advantageously equipped with framework 16 (FIG. 2) in which the lower right and left ends are provided with holes 10 and 11, respectively, for attachment of the connecting system 30, 40 for connecting transparent visor 2 to opaque visor 1.

For the assembly, transparent visor 2 is secured to opaque visor 1 by fastening rod 7 of part 30 in opening 10 (FIG. 1A) or in part 13 (FIG. 3A) provided in opaque visor 1. Advantageously, when rod 7 is terminated by a socket (FIGS. 1A and 3C), it will have been previously inserted into a plastic part that will clip into horizontal rod 9.

Then, hook 17 is fastened into opaque visor 1, after which visor 2 can be attached or hooked via opening 4 shown at its upper left portion. Hook 17 can either be equipped with threads, such as provided on a screw, or with a clip 18.

A visor according to the invention, in its preferred form of construction, as shown in FIGS. 4, can easily assume a variety of configurations. During normal use of the opaque visor 1, as shown in FIGS. 4B or 4C, transparent visor 2 is not used. Visor 2 can be oriented to extend away from visor 1, with visors 1 and 2 being in a vertical position as shown in FIG. 4G, or in a forward inclined position as shown in FIGS. 4G and 4E, or visor 1 can be folded up to raise the level of visor 2, as shown in FIGS. 4D and 4F.

Figure 4A:
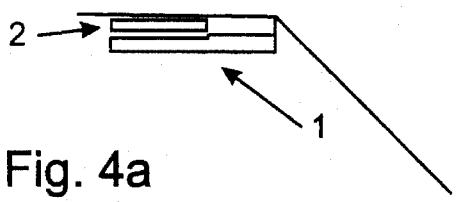
FIGS. 4A–4G schematically represent different possible positions of an opaque visor and a transparent visor in accordance with the present invention.
Figure 4B:
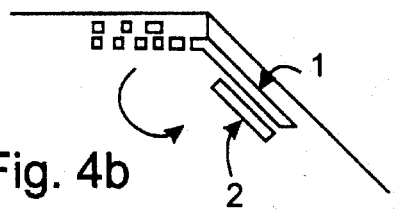
Figure 4C:
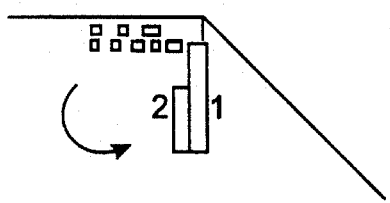

The transparent visor 2 shown in FIG. 4A is in a non-active position, meaning that it is located between main visor 1 and the roof of the vehicle. When the main visor 1 has been lowered, as shown in FIG. 4C, transparent visor 2 can be pivoted down by simple rotation, into any one of the positions shown in FIGS. 4D, 4E and 4G.

Figure 4D:
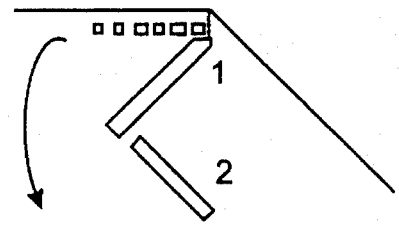
Figure 4E:
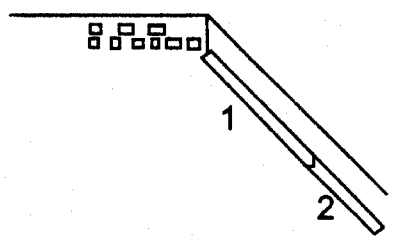
Figure 4F:
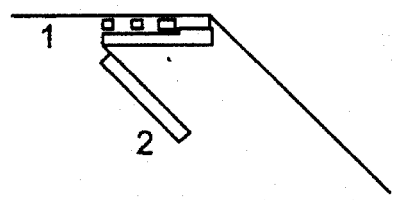
Figure 4G:
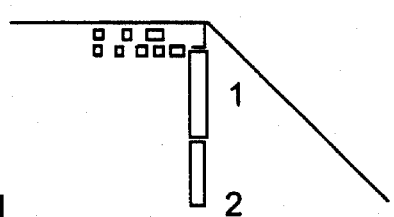

As indicated by the positions shown in FIGS. 4D and 4F, it is possible for the driver to benefit from the comfort of transparent visor 2 if he is blinded by driving lights or by an equally glaring light source. Then, transparent visor 2 is useable in the same manner as a conventional visor, meaning that reliance need not be placed on opaque visor 1 (FIG. 4F).

According to preferred embodiments of the invention, visor 2 could be fabricated from a polymer material, for example a polycarbonate, and can be interchangeable and/or be fitted with a frame 5 (FIGS. 1A and 2) into which the transparent part of visor 2 can slide.

Although the illustration and description relate to what is considered to be at present preferred embodiments of the invention, it is obvious that one skilled in the art will be able to devise changes and modifications in keeping with the scope of the invention, as defined in the claims.

I claim:

1. A visor assembly for use in a motor vehicle which has a windshield, the windshield having two end sections and a center section between the end sections, said visor assembly being installable inside the vehicle facing one end section of the vehicle, and said visor assembly comprising: a first visor having upper and lower longitudinal edges and first and second side edges extending between said longitudinal edges; a second visor having first and second longitudinal edges and first and second side edges extending between said first and second longitudinal edges; and connecting means for connecting said second visor to said first visor, said connecting means being connected between said lower longitudinal edge of said first visor and said first longitudinal edge of said second visor, and said first connecting means comprising a first part for detachably connecting said first and second visors together and a second part forming a pivot joint between said second visor and said first visor, said second part being located for permitting said second visor to pivot relative to said first visor about a first axis transverse to said lower longitudinal edge of said first visor over a path which brings said second visor to a position facing the center section of the windshield, wherein said first part of said connecting means comprises a hook attached to said first visor and engageable with said second visor, and said second part of said connecting means comprises a first rod forming the first axis and a second rod engaging one of said visors, pivotally secured to said first rod, and defining a second axis perpendicular to the first axis, said second visor being pivotable relative to said first visor about said second axis.

2. A visor assembly according to claim 1 wherein said second part of said connecting means is located in proximity to said second side edges of said first and second visors and, when said assembly is installed in the vehicle, said second side edges of said visors are directed toward the center section of the windshield.

3. A visor assembly according to claim 2 wherein said first visor is opaque and said second visor is transparent.

4. A visor assembly according to claim 3 wherein said second visor is tinted.

5. A visor assembly according to claim 14 wherein said first rod has an end forming a socket and said second rod has an opening which receives said socket, said socket and said opening constituting said pivot joint.

6. A visor assembly according to claims 1 or 5 wherein said first visor comprises a framework and two fastening elements secured to said framework along said lower longitudinal edge, and said fastening elements secure said first and second parts of said connecting means to said first visor.

7. A visor assembly according to claims 1 or 5 wherein said first visor is provided with first and second openings at said lower longitudinal edge, said hook is installed in said first opening and said first rod is installed in said second opening, and said first and second openings are formed to receive stoppers if said second visor is not present.

8. A visor assembly according to claims 1 or 5 wherein said hook has a clip portion that is fastened to said first visor.

9. A visor assembly according to claims 1 or 5 wherein said second visor is provided with an opening engageable by said hook.

10. A visor assembly according to claims 1 or 5 wherein said hook has a hollow section having a form corresponding to said first longitudinal edge of said second visor.

11. A visor assembly according to claims 1, 2, 3, or 4 wherein said first and second visors have substantially equal longitudinal edge lengths, and said first part of said connecting means is located in proximity to said first side edges of said first and second visors.

\* \* \* \* \*